United States Patent
Ashwood-Smith (10) Patent No.: US 10,015,053 B2
(45) Date of Patent: Jul. 3, 2018

(54) TRANSPORT SOFTWARE DEFINED NETWORKING (SDN)—LOGICAL LINK AGGREGATION (LAG) MEMBER SIGNALING

(71) Applicant: Huawei Technologies Co., Ltd., Shenzhen (CN)

(72) Inventor: Peter Ashwood-Smith, Gatineau (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 124 days.

(21) Appl. No.: 14/718,949

(22) Filed: May 21, 2015

(65) Prior Publication Data

US 2016/0344652 A1 Nov. 24, 2016

(51) Int. Cl.
*G06F 15/173* (2006.01)
*H04L 12/24* (2006.01)
(Continued)

(52) U.S. Cl.
CPC ............ *H04L 41/12* (2013.01); *H04L 45/245* (2013.01); *H04L 45/02* (2013.01); *H04L 45/26* (2013.01); *H04L 45/64* (2013.01); *Y02B 60/33* (2013.01)

(58) Field of Classification Search
CPC ....... H04L 41/12; H04L 45/02; H04L 45/245; H04L 47/41; H04L 12/2867;
(Continued)

(56) References Cited

U.S. PATENT DOCUMENTS 6,757,258 B1 6/2004 Pillay-Esnault
7,903,554 B1 * 3/2011 Manur ................ H04L 45/026
370/230.1
(Continued)

FOREIGN PATENT DOCUMENTS

CN 102158348 A1 8/2011
CN 103501236 A 1/2014
(Continued)

OTHER PUBLICATIONS

Haleplidis, Ed., et al., "Software-Defined Networking (SDN): Layers and Architecture Terminology," RFC 7426, Jan. 2015, 36 pages.
(Continued)

*Primary Examiner* — Dustin Nguyen
(74) *Attorney, Agent, or Firm* — Conley Rose, P.C.

(57) ABSTRACT

Disclosed herein is a transport software defined networking (SDN) controller, comprising a receiver configured to receive advertisement messages from physical layer NEs, each advertisement message indicating a mapping between a physical layer network elements (NE) port and an adjacent network layer NE, and a processor coupled to the receiver. The SDC controller is configured to determine a relationship between a logical topology and a physical topology, inspect a network layer link aggregation group (LAG) request, the request indicating a first network layer NE is requesting modification of a LAG with a second network layer NE, and modify a physical layer connection between a physical layer NE adjacent to the first network layer NE and a second physical layer NE adjacent to the second network layer NE to implement the LAG modification based on the relationship between the physical topology and the logical topology.

20 Claims, 6 Drawing Sheets

(51) Int. Cl.
*H04L 12/709* (2013.01)
*H04L 12/715* (2013.01)
*H04L 12/751* (2013.01)
*H04L 12/721* (2013.01)

(58) Field of Classification Search
CPC ....... H04L 45/026; H04L 45/38; H04L 49/70; H04L 43/0811; H04L 45/586; H04B 10/25
USPC ................ 370/225, 235, 228, 223, 250, 392
See application file for complete search history.

(56) References Cited

U.S. PATENT DOCUMENTS

| | | | |
|---|---|---|---|
| 8,014,278 B1* | 9/2011 | Subramanian | H04L 12/2867 370/229 |
| 8,243,594 B1* | 8/2012 | Fotedar | H04L 45/245 370/229 |
| 8,942,256 B1* | 1/2015 | Barth | H04L 45/02 370/255 |
| 9,225,597 B2 | 12/2015 | Tubaltsev et al. | |
| 9,300,592 B2* | 3/2016 | Macchiano | H04L 47/41 |
| 9,450,817 B1 | 9/2016 | Bahadur et al. | |
| 9,641,249 B2* | 5/2017 | Kaneriya | H04B 10/25 |
| 9,860,350 B2* | 1/2018 | Ashwood-Smith | H04L 41/12 |
| 2002/0118647 A1 | 8/2002 | Maeno | |
| 2002/0196494 A1* | 12/2002 | McGuire, Jr. | G02B 6/356 398/82 |
| 2006/0221865 A1 | 10/2006 | Hawbaker et al. | |
| 2009/0087184 A1 | 4/2009 | Gao et al. | |
| 2011/0299536 A1 | 12/2011 | Cheng et al. | |
| 2012/0033665 A1* | 2/2012 | Jacob Da Silva | H04L 45/245 370/389 |
| 2012/0230185 A1* | 9/2012 | Yong | H04L 45/02 370/228 |
| 2013/0121141 A1 | 5/2013 | Hao | |
| 2013/0286846 A1 | 10/2013 | Atlas et al. | |
| 2013/0301407 A1* | 11/2013 | Zhou | H04L 45/245 370/230 |
| 2013/0336317 A1* | 12/2013 | Mithyantha | H04L 45/586 370/390 |
| 2014/0119367 A1 | 5/2014 | Han et al. | |
| 2014/0301401 A1* | 10/2014 | Wang | H04L 49/70 370/395.53 |
| 2014/0325038 A1 | 10/2014 | Kis | |
| 2014/0355615 A1 | 12/2014 | Chang | |
| 2014/0362709 A1* | 12/2014 | Kashyap | H04L 41/12 370/250 |
| 2015/0019712 A1 | 1/2015 | Senthilkumar | |
| 2015/0043378 A1 | 2/2015 | Bardgett et al. | |
| 2015/0043589 A1 | 2/2015 | Han et al. | |
| 2015/0063802 A1 | 3/2015 | Bahadur et al. | |
| 2015/0103844 A1 | 4/2015 | Zhao et al. | |
| 2015/0104166 A1 | 4/2015 | Patel et al. | |
| 2015/0110107 A1 | 4/2015 | Ishizuka et al. | |
| 2015/0117451 A1 | 4/2015 | Kaneriya et al. | |
| 2015/0220740 A1 | 8/2015 | Patel et al. | |
| 2015/0244605 A1 | 8/2015 | Grandi et al. | |
| 2015/0244607 A1 | 8/2015 | Han | |
| 2015/0281072 A1* | 10/2015 | Arumugam | H04L 45/245 370/392 |
| 2015/0350059 A1 | 12/2015 | Chunduri et al. | |
| 2015/0381428 A1* | 12/2015 | Ong | H04L 41/12 709/223 |
| 2016/0006609 A1 | 1/2016 | Zhao | |
| 2016/0014023 A1 | 1/2016 | He et al. | |
| 2016/0028602 A1* | 1/2016 | Mishra | H04L 43/0811 370/236.2 |
| 2016/0050156 A1* | 2/2016 | Bergeron | H04L 47/41 370/235 |
| 2016/0062746 A1 | 3/2016 | Chiosi et al. | |
| 2016/0072696 A1 | 3/2016 | He et al. | |
| 2016/0156480 A1 | 6/2016 | Liu | |
| 2016/0182400 A1 | 6/2016 | Ceccarelli et al. | |
| 2016/0182982 A1 | 6/2016 | Schmidtke et al. | |
| 2016/0197824 A1* | 7/2016 | Lin | H04L 45/38 370/389 |
| 2016/0248664 A1 | 8/2016 | Huang | |
| 2016/0269272 A1 | 9/2016 | Li et al. | |
| 2016/0315866 A1 | 10/2016 | Thapar et al. | |

FOREIGN PATENT DOCUMENTS

| | | |
|---|---|---|
| CN | 104283722 A | 1/2015 |
| CN | 104283791 A | 1/2015 |
| CN | 104320345 A | 1/2015 |
| EP | 2814213 A1 | 12/2014 |
| EP | 2843888 A1 | 3/2015 |
| WO | 2004032562 A1 | 4/2004 |
| WO | 2011147373 A1 | 12/2011 |

OTHER PUBLICATIONS

Foreign Communication From a Counterpart Application, PCT Application No. PCT/CN2016/078863, International Search Report dated Jul. 14, 2016, 7 pages.

Foreign Communication From a Counterpart Application, PCT Application No. PCT/CN2016/078863, Written Opinion dated Jul. 14, 2016, 4 pages.

Partial English Translation and Abstract of Chinese Patent Application No. CN104320345, Aug. 22, 2016, 5 pages.

Foreign Communication From a Counterpart Application, PCT Application No. PCT/CN2016/078734, International Search Report dated Jun. 29, 2016, 7 pages.

Foreign Communication From a Counterpart Application, PCT Application No. PCT/CN2016/078734, Written Opinion dated Jun. 29, 2016, 4 pages.

Foreign Communication From a Counterpart Application, PCT Application No. PCT/CN2016/078735, International Search Report dated Jul. 6, 2016, 7 pages.

Foreign Communication From a Counterpart Application, PCT Application No. PCT/CN2016/078735, Written Opinion dated Jul. 6, 2016, 4 pages.

Office Action dated Oct. 6, 2016, 30 pages, U.S. Appl. No. 14/709,697, filed May 12, 2015.

Office Action dated Nov. 4, 2016, 26 pages, U.S. Appl. No. 14/718,941, filed May 21, 2015.

Foreign Communication From a Counterpart Application, European Application No. 16795759.6, Extended European Search Report dated Feb. 19, 2018, 9 pages.

Foreign Communication From a Counterpart Application, European Application No. 16791968.7, Extended European Search Report dated Mar. 28, 2018, 11 pages.

Auster, M., et al., "OpenFlow-enabled Transport SDN," XP055467565, ONF, Mar. 27, 2014, 16 pages.

Liu, L., et al., "Experimental demonstration of an OpenFlow/PCE integrated control plane for IP over translucent WSON with the assistance of a per-request-based dynamic topology server," XP002734579, Optics Express, vol. 21, No. 4, Feb. 25, 2013, 12 pages.

Foreign Communication From a Counterpart Application, European Application No. 16795757.0, Extended European Search Report dated Apr. 24, 2018, 10 pages.

* cited by examiner

TRANSPORT SOFTWARE DEFINED NETWORKING (SDN)—LOGICAL LINK AGGREGATION (LAG) MEMBER SIGNALING

TECHNICAL FIELD

The present invention relates to a system and method for transport network communications, and, in particular, to a system and method for logical Link Aggregation Member signaling.

BACKGROUND

Conventional computer networks are built from a large number of network devices, such as routers, switches, and/or other hardware. Management of a large network can be complex and costly. It is believed that the complexity can be addressed by replacing the fully distributed protocols for control and data forwarding employed in traditional routers with centralized protocols. For example, in a centrally-controlled network, data forwarding (e.g. data plane) can be decoupled from control decisions (e.g. control plane), such as routing, resource, management, and other management functionalities. The decoupling also allows the data plane and the control plane to operate on different hardware, in different runtime environments, and/or operate using different models. In the centrally-controlled network, network intelligence is logically centralized in software-based controllers. Thus, network devices become packet forwarding devices that are managed and controlled by the centralized controllers.

SUMMARY

A transport software defined networking (SDN) controller is disclosed herein. In one embodiment, the transport SDN controller may comprise a receiver configured to receive advertisement messages from physical layer network elements (NEs), each advertisement message indicating a mapping between a physical layer NE port and an adjacent network layer NE and a processor coupled to the receiver. The processor may be configured to cause the transport SDN controller to determine a physical topology based on physical layer adjacency discovery messages received from physical layer NEs, determine a logical topology based on network layer adjacency discovery messages received from network layer NEs, and determine a relationship between the logical topology and the physical topology based on the advertisement messages from the physical layer NEs. The processor may be configured to further cause the transport SDN controller to inspect a network layer link aggregation group (LAG) request that indicates that a first network layer NE is requesting a network layer LAG link member with a second network layer NE. The processor may be configured to further cause the transport SDN controller to setup a physical layer connection between a first adjacent physical layer NE port of the first network layer NE and a second adjacent physical layer NE port of the second network layer NE to implement the requested network layer LAG link member based on the relationship between the physical topology and the logical topology and based on inspecting the network layer LAG request.

In another embodiment, the disclosure includes a method of adding a LAG member link implemented by a transport SDN controller. The method may comprise receiving physical layer adjacency discovery messages from physical layer NEs that indicate physical layer port adjacency information, determining a physical topology based on the physical layer adjacency discovery messages, receiving network layer adjacency discovery messages from network layer NEs, and determining a logical topology based on the network layer adjacency discovery messages. The method may further comprise receiving advertisement messages from the physical layer NEs, each advertisement message indicating a mapping between a physical layer NE port and an adjacent network layer NE, determining a relationship between the logical topology and the physical topology based on the advertisement messages, and inspecting a network layer LAG request that indicates that a first network layer NE is requesting a network layer LAG link member with a second network layer NE. The method may further comprise setting up a physical layer connection between a first adjacent physical layer NE port of the first network layer NE and a second adjacent physical layer NE port of the second network layer NE to implement the requested network layer LAG link member based on the relationship between the physical topology and the logical topology and based on inspecting the network layer LAG request.

In another embodiment, the disclosure includes another method of removing a link aggregation group member link by a transport software defined networking controller (T-SDNC). The method may comprise determining a physical topology based on physical layer adjacency discovery messages received from physical layer NEs, determining a logical topology based on network layer adjacency discovery messages received from network layer NEs, and determining a relationship between the logical topology and the physical topology based on advertisement messages from the physical layer NEs, each advertisement message indicates a mapping between a physical layer NE port and an adjacent network layer NE. The method may further comprise receiving a network layer LAG request indicating that a first network layer NE is requesting to remove a network layer LAG link member with a second network layer NE and removing a physical layer connection between the first network layer NE and the second network layer NE based on the network layer LAG request and the relationship between the physical topology and the logical topology.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some networks, routers and switches are placed and configured in a way that defines the flow of data in a network. Subsequent changes to the routers and/or switches may be expensive as physical locations and/or hardware changes may require manual configurations. SDN is a networking paradigm where the management of data flow (e.g. control plane) and the delivery of data (e.g. data plane) are decoupled, which creates a flexible network through dynamic management and control. In an SDN network, network devices (e.g. routers and/or switches) are controlled and managed by one or more SDN controllers (SDNCs). An SDNC is any device configured to control and manage an SDN domain. The SDNCs make routing and/or switching decisions and then communicate the decisions to the network devices. For example, SDNCs compute best paths for routing packets from one node to another node based on network topology information and then transmit route tables, switching tables, and/or flow tables to all network devices along the best path. The network devices perform data forwarding functions according to the route tables received from the SDNCs. The SDNCs also modify the behavior of an SDN network dynamically to adapt to changes in the network (e.g. infrastructure changes, new applications, new service deployment, and/or business requirement changes).

An SDN may be logically divided into multiple layers according to the Open Systems Interconnection (OSI) network or other protocol layer paradigm. For example, routing and/or switching functions may be performed by OSI layer 3 and layer 2 devices, respectively, which are collectively referred to herein as the network layer. OSI layer 1 (e.g., synchronous optical network (Sonet)/synchronous digital hierarchy (SDH) and optical transport network (OTN)) and layer 0 (e.g., dense wavelength division multiplexing (DWDM), photonics), which are collectively referred to herein as the transport layer. Accordingly, network SDNCs (N-SDNCs) manage network functions for devices operating on OSI layers 3 and/or 2, while transport SDNCs (T-SDNCs) manage functions for devices operating on OSI layers 1 and 0. N-SDNCs and T-SDNCs may not be configured to interact directly, requiring SDN changes to be implemented separately at the network layer and the transport layer.

SDNs employ links aggregation to connect NEs. Link aggregation allows multiple parallel links to be logically aggregated to create a LAG. Any link assigned to a LAG is referred to as a LAG link and/or a LAG member. The network can then treat the LAG as a single link for network management purposes. The LAG comprises a total capacity (e.g. maximum bandwidth) equal to the sum of the individual capacities of the LAG link members. Adding or removing links to a LAG changes the capacity of the LAG accordingly. At the transport layer, a link may be assigned to a LAG by assigning optical ports on NEs supporting the link to perform associated data transmission. In some embodiments, such optical ports may employ wavelength and/or frequency division multiplying. In such cases, a link may be assigned to a LAG by assigning a particular light wavelength, referred to as a lambda (λ), and/or a time division portion of a lambda to support the data transmission. As such, in order to modify a network layer LAG, administrators may be required to separately modify port and/or wavelength assignments at the transport layer, which may result in significant costs in personnel time and create a potential source of misconfiguration errors.

Disclosed herein are mechanisms for automatically configuring transport layer connections to implement network layer LAG link member additions or removals. When a network layer LAG modification is requested, the request is encoded in a network layer adjacency discovery message, network layer maintenance message, and/or network layer LAG request message and transmitted between network layer NEs. For example, the network layer LAG request message may be a link state advertisement (LSA) message. The request is multiplexed onto a bitstream and forwarded between the network layer NEs via physical layer NEs. The physical layer NEs inspect the bitstream for LAG requests. When a LAG request is received by a physical layer NE, the physical layer NE inspects header information from the LAG request and transmits an advertisement message comprising information inspected from the network layer LAG request to a T-SDNC. The T-SDNC is aware of a physical topology of the network, a logical topology of the network, and a relationship of the physical topology and the logical topology based on mechanisms disclosed in as discussed in U.S. non-provisional application "Transport Software Defined Networking (SDN)—Logical to Physical Topology Discovery" by Peter Ashwood-Smith application Ser. No. 14/709,697 filed on May 12, 2015, which is incorporated by reference. The T-SDNC assigns NE ports, lambdas, and/or time slot portions of lambdas to support creation of the requested network layer LAG based on the advertised network layer LAG information and the topology information. Alternatively, the T-SDNC may receive and inspect the network layer LAG request messages directly, for example by listening passively on a physical passive interface of the T-SDNC. The T-SDNC then assigns the appropriate physical resources to implement the LAG change based on the topology information.

Figure 1:
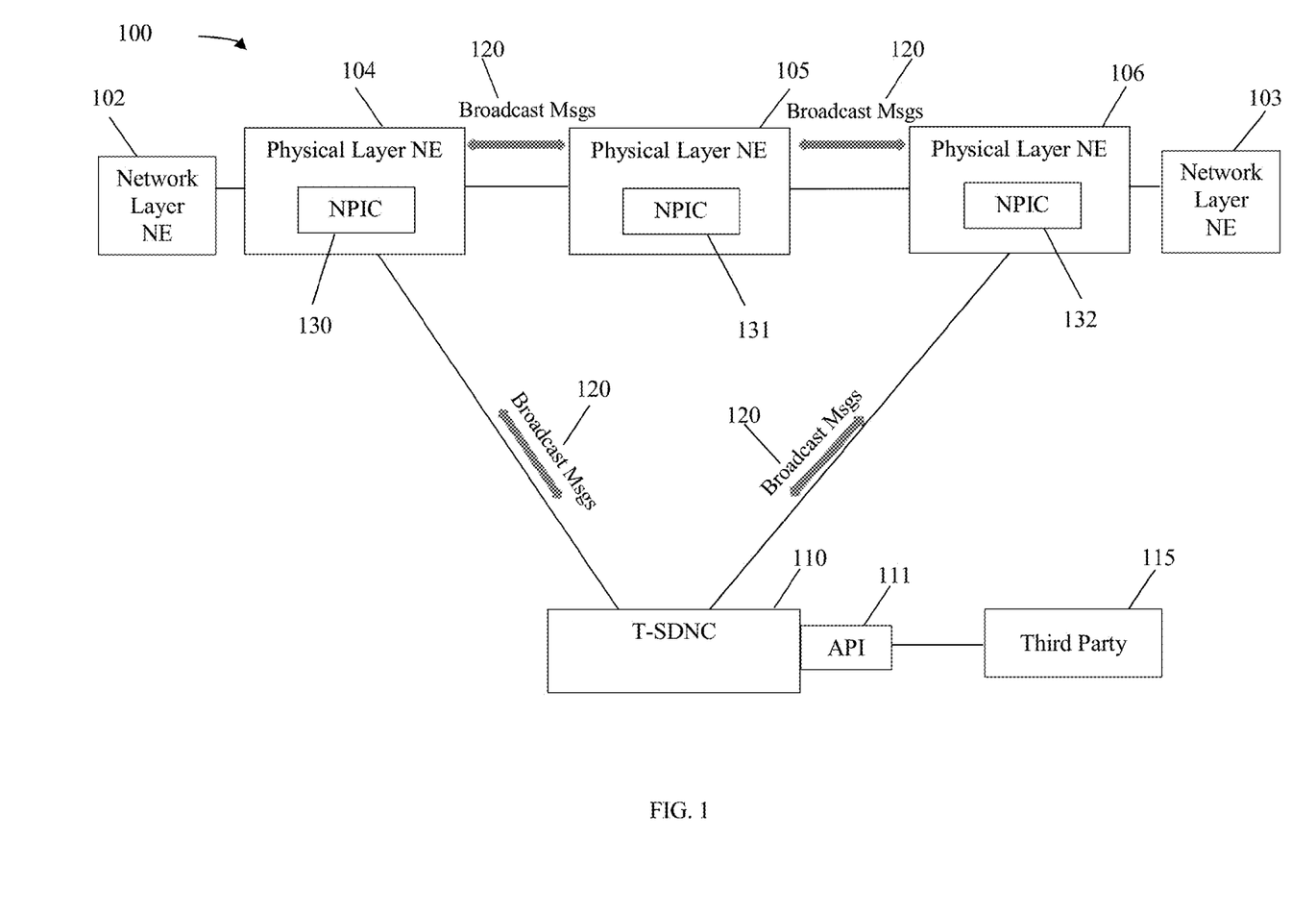
FIG. 1 is a schematic diagram of an embodiment of a communication network.

FIG. 1 is a schematic diagram of an embodiment of a communication network 100. Network 100 comprises physical layer NEs 104, 105, and 106, network layer NEs 102 and 103, and a T-SDNC 110 comprising an application programming interface (API) 111 for communicating with a third party 115, such as a system administrator. The physical layer NEs 104-106 are communicatively coupled via optical links. The T-SDNC 110 is communicatively coupled to the physical layer NEs 104-106 by optical links, electrical links, or combinations thereof. The network layer NEs 102-103 are communicatively coupled to the physical layer NEs 104-106 via optical links, electrical links, or combinations thereof.

The network layer NEs 102-103 may be any physical and/or logical device (e.g. router) configured to perform data packet forwarding functions on a data signal/bitstream. The network layer NEs 102-103 operate at the network layer of the OSI model (e.g. layer 2, 3, and/or 4). Connections and/or other links shown in FIG. 1 include physical connections, such as fiber optic links, electrical links, wireless links, and/or logic connections. The connections may comprise a single link, a series of parallel links, a plurality of interconnected nodes, and/or various combinations thereof used to transport data between network devices.

The physical layer NEs 104-106 may be any physical device (e.g. switch) configured to perform data forwarding functions according to SDN routes specified by T-SDNC(s) 110 in an SDN domain. The physical layer NEs 104-106 comprise network packet interface cards (NPICs) 130, 131, and 132, respectively, physical ports, and processors. The processors are coupled to the NPICs and are configured to perform a variety of functions. In an embodiment, the physical layer NE 104 performs functions of an optical switch. For example, a physical layer NE 104 may comprise a mapping, provided by the T-SDNC, that maps an upstream port to a downstream port, allowing the physical layer NE 104 to perform data forwarding. A signal may be received from network layer NE 102 and forwarded to physical layer NE 105. The signal may be forwarded across the NPIC 130, allowing the NPIC 130 to inspect messages encoded in the signal, such as broadcast messages 120. The signal may be forwarded across physical links to physical layer NEs 104 and 105 and via NPICs 131 and 132, respectively, toward a destination, e.g. via network layer NE 103. The NPICs 130-132 and associated processors may not be configured to modify header information contained in messages encoded in the signal. Said in other words, the physical layer NEs 104-106 may forward an encoded data packet and/or data frame across the network 100 by performing wavelength and/or port switching without making modification to headers and/or data encoded on messages encoded in the signal.

The NPICs 130-132 receive bitstreams/signals comprising broadcast messages 120 (e.g. adjacency discovery messages, network layer maintenance messages, and network layer LAG request messages). The adjacency discovery messages may be any of open shortest path first (OSPF) messages, intermediate system to intermediate system (IS-IS) messages, border gateway protocol (BGP) messages, or another type of adjacency discovery message. The adjacency discovery messages may be any of a network layer adjacency discovery messages and/or a physical layer adjacency discovery messages. The network layer adjacency discovery messages are broadcasted between communicatively coupled network layer NEs 102-103 operating at the network layer of the OSI model and comprise information of network layer NE 102-103 adjacencies. The physical layer adjacency discovery messages are broadcasted between communicatively coupled physical layer NEs 104-106 operating at the physical layer of the open systems interconnection model and comprise information of physical layer NEs 104-106 adjacencies.

Similar to the adjacency discovery message, a network layer LAG request message may be carried in any of an OSPF message, an IS-IS message, a BGP message, or another type of network layer LAG request message. For example, when a network layer NE (e.g., network layer NE 102 or 103) is configured to add or remove an LAG link member with another network layer NE (e.g., network layer NE 103 or 102), a request for an addition or removal, respectively, of the network layer LAG link member with the other network layer NE is transmitted by the network layer NE 102 or 103 in a network layer LAG request message. A network layer LAG request message requests an addition or removal of an LAG link member between two network layer NEs. A plurality of parallel LAG link members may operate between two network layer NEs. The LAG operates as a single connection with a capacity equal to the total capacity of the plurality of LAG link members. The network layer LAG request messages are broadcasted between communicatively coupled network layer NEs 102-103 operating at the network layer of the OSI model. The network layer LAG request message requests a LAG link member to be added or removed between two network layer NEs. Alternatively, link utilization is monitored and a network layer LAG request is generated automatically, e.g. by a monitoring application, a N-SDNC, etc. For example, when link utilization between two network layer NEs rises above a percentage, for example fifty percent, of a first threshold, a new LAG request to add a LAG link member is generated; when link utilization between the two network layer NEs drops below a percentage, for example twenty percent, of a second threshold, a new LAG request to remove an LAG link member is generated, etc. In an alternate embodiment, LAG requests are transmitted/broadcasted periodically to maintain LAGs in the network 100. In such a case, additional and/or updated LAG requests are employed to create new LAGs and add new link members to an existing LAG. Further, an omission of a LAG request received in a previous period can be considered a request to remove an associated LAG and/or LAG link member.

The NPICs 130-132 inspect the broadcast messages 120, for example by reviewing the contents of the broadcast messages via a snooping utility. As used herein, inspecting indicates reviewing contents of a packet traversing an interface without altering the packet. The network layer adjacency discovery messages between network layer NEs 102-103 may be encoded in an OSPF hello message, an IS-IS hello message, or another type of adjacency discovery message. Headers of the network layer adjacency discovery message comprise information of adjacent network layer NEs 102 and 103. The NPICs 130-132 determine which local physical port received the network layer adjacency discovery message and then map the physical port of the physical layer NE to the layer 2/layer 3 address (e.g. media access control (MAC)/internet protocol (IP) address) of the adjacent network layer NE to assist in mapping a physical topology to a network topology. Such adjacency mappings are forwarded to the T-SDNC 110 in an advertisement message to support creation/deletion of connections to support modifications of LAGs. In an embodiment, the advertisement message may be an OSPF LSA message. For example, the NPIC 130 or the physical layer NE 104 may append the mapping information to the OSPF LSA message. The mapping information or the advertisement message may comprise an identification of the physical layer NE 104, a physical port identification, and an identification of the adjacent network layer NE 102.

The T-SDNC 110 is any device configured to control and manage a transport layer of an SDN domain. Each T-SDNC 110 is physically and/or logically located within an SDN domain. A third party 115 may have access to the T-SDNC 110 through an API 111. T-SDNCs 110 perform a variety of control plane functions that comprise generating and obtaining routing information, network topology, and/or network state information. For example, the T-SDNC 110 generates and broadcasts (e.g. via advertisement message(s)) SDN specific topology information of the SDN domain that the T-SDNC 110 manages and/or supports. Accordingly, the T-SDNC 110 may receive SDN specific topology information of other SDN domains that are supported and/or managed by other SDNCs 110. Each T-SDNC 110 configures physical layer NEs 104-106 in an SDN domain that the T-SDNC 110 manages, for example, by transmitting flow tables to the physical layer NEs 104-106. Each T-SDNC 110 communicates with a physical layer NEs 104-106 over a controller-device interface, which may employ any standardized protocol (e.g. the OpenFlow protocol). It should be noted that each T-SDNC 110 may also broadcast any link state information commonly employed in any Interior Gateway Protocol (IGP).

Figure 2:
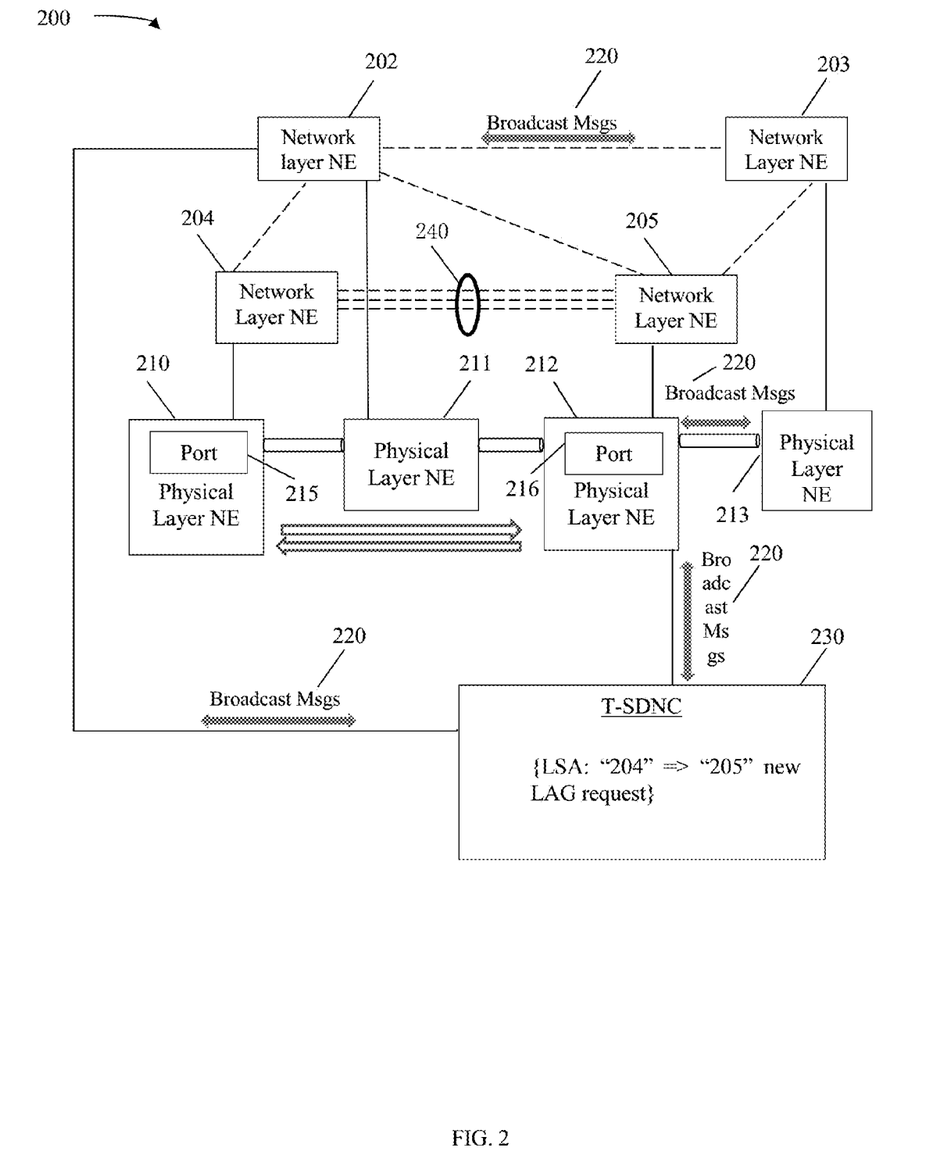
FIG. 2 is a schematic diagram of another embodiment of a communication network.

The T-SDNC 110 receives physical layer adjacency discovery messages from the physical layer NEs 104-106. The physical layer adjacency discovery messages indicate adjacencies between physical ports of the physical layer NEs 104-106. For example, a physical layer adjacency discovery message comprises an identification of a first physical layer NE 104, an identification of a first physical port that is part of the first physical layer NE 104, an identification of a second physical layer NE 105, and/or an identification of a second physical port that is part of the second physical layer NE 105. The first and second physical ports are adjacent at the physical layer and the first and second physical layer NEs 104-105 are adjacent at the physical layer. A physical topology is determined by the T-SDNC 110 based on the physical layer adjacency discovery messages. For example, the T-SDNC 110 may build a physical topology based on identifications of the physical ports and physical layer NEs 104-106 in the physical layer adjacency discovery messages. The T-SDNC 110 may determine a physical topology as shown in FIG. 2. The physical layer adjacency discovery messages may comprise other physical layer constraints and the T-SDNC 110 may learn the other physical layer constraints. It should be noted that the T-SDNC 110 may also determine a logical topology based on network layer advertisements and map the logical topology to the physical topology as discussed in U.S. non-provisional application "Transport Software Defined Networking (SDN)—Logical to Physical Topology Discovery" by Peter Ashwood-Smith. Such physical to logical topology mappings may be employed to support configuring physical layer connections to implement network layer LAG link member additions or removals.

FIG. 2 is a schematic diagram of another embodiment of a communication network 200. Network 200 comprises network layer NEs 202, 203, 204, and 205, physical layer NEs 210, 211, 212, and 213, T-SDNC 230, and broadcast messages 220, which may be substantially similar to network layer NEs 102 and 103, physical layer NEs 104, 105, and 106, T-SDNC 110, and broadcast messages 120, respectively. The T-SDNC 230 receives broadcast messages 220 comprising network layer adjacency discovery messages, physical layer adjacency discovery messages, and/or network layer LAG request messages. The physical layer NEs 210-213 receive bitstreams comprising broadcast messages 220 (e.g. adjacency discovery messages, network layer LAG request message, and network layer maintenance messages). In an embodiment, the at least some of the broadcast messages 220 may network layer messages, in which cases such messages are generally opaque to the physical layer. Physical layer components may passively listen and inspect opaque data, but may not be configured to modify opaque data or transmit network layer messages that are directly responsive to the opaque data.

The adjacency discovery messages may be any of an OSPF message, an IS-IS message, a BGP message, or another type of adjacency discovery message. The adjacency discovery messages may be any of a network layer adjacency discovery message or a physical layer adjacency discovery message. The network layer adjacency discovery messages are broadcasted between communicatively coupled network layer NEs 202-205 operating at the network layer of the OSI model and comprise information of network layer NE 202-205 adjacencies. The physical layer adjacency discovery messages 220 are broadcasted between communicatively coupled physical layer NEs 210-213 operating at the physical layer of the open systems interconnection model and comprise information of physical layer NE 210-213 adjacencies. Similarly, the network layer LAG request messages may be any of an OSPF message, an IS-IS message, a BGP message, or another type of LAG request message. The network layer adjacency discovery messages are broadcasted between communicatively coupled network layer NEs 202-205.

The network layer adjacency discovery messages comprise identifications of adjacent network layer NEs 202-205. Similar to how the physical topology is determined by the T-SDNC 230, a logical topology is determined by the T-SDNC 230 based on the received network layer adjacency discovery messages. For example, the T-SDNC 230 may determine that network layer NEs 202-205 are logically connected in a mesh topology. Additionally, the advertisement messages from the physical layer NEs 210-213 are received at the T-SDNC 230. For example, an advertisement message transmitted by the physical layer NE 210 comprises information that the port 215 of the physical layer NE 210 is adjacent to the network layer NE 204. An advertisement message transmitted by the physical layer NE 212 comprises information that the port 216 of the physical layer NE 212 is adjacent to the network layer NE 205. Similar advertisement messages are transmitted by physical layer NEs 211 and 213. The advertisement messages are received by the T-SDNC 230. A relationship/mapping of the physical topology and the logical topology is thus determined by the T-SDNC 230 based on the determined physical topology, the determined logical topology, and/or the received advertisement messages.

The network layer LAG request messages comprise identifications of network layer NEs (e.g., network layer NEs 204 and 205) that request to add, remove, or maintain a network layer LAG link member with respect to an existing LAG 240. The network layer LAG request message may be an OSPF LSA message. The T-SDNC 230 may receive the network layer LAG request message, for example by passively listening on a physical passive interface of the T-SDNC 230. The T-SDNC 230 inspects the network layer LAG request message, for example by inspecting a header of the network layer LAG request message, to obtain network layer LAG request information. The T-SDNC 230 determines that adding or removing a physical layer connection between the physical layer NE ports 215 and 216 implements an addition or removal of a network layer LAG link member between the network layer NEs 204 and 205 based on the mapping of the physical topology to the logical topology. The T-SDNC 230 then sets up or removes a physical layer connection between the physical layer NE ports 215 and 216. After the physical layer connection between the physical layer NE ports 215 and 216 is added or removed, the T-SDNC 230 may or may not transmit an acknowledgement message to each of the network layer NEs 204 and 205. In an embodiment, a T-SDNC 230 may receive periodic network layer LAG request messages that identify existing LAGs and/or LAG link members and request that such LAGs and/or LAG link members be refreshed. The T-SDNC 230 may employ a timer or similar mechanism associated with each network layer LAG request message. Upon expiration of the timer (e.g. a timeout), the T-SDNC 230 may consider the lack of a refreshing LAG request as a request to remove the associated LAG or link members. The T-SDNC 230 may then remove the LAG/link member accordingly. The duration a LAG/member link can exist without a refresh may be set by the T-SDNC 230 or may be signaled by the network layer (e.g. in the LAG request as LAG request information) and inspected by the T-SDNC 230.

Alternatively, the network layer LAG request messages may be received by the physical layer NEs, for example by the physical layer NEs 210 and 212, and then advertised/broadcast by the physical layer NEs. For example, the physical layer NEs 210 and 212 inspect the network layer LAG request message, for example by inspecting a header of the network layer LAG request message, to obtain network layer LAG request information. The physical layer NEs 210 and 212 then broadcast the network layer LAG request information in advertisement messages transmitted at the physical layer, similar to how the mapping of the physical port to the adjacent network layer is broadcasted by the physical layer NEs 210-213. Thus, the T-SDNC 230 determines that the network layer NE 204 is requesting a network layer LAG link member to be added, removed, or maintained in a LAG 240 connection with the network layer NE 205. The T-SDNC 230 also determines that adding, removing, or refreshing a physical layer connection between the physical layer NE ports 215 and 216 implements the addition, removal, or refreshing of a network layer LAG link member between the network layer NEs 204 and 205. The T-SDNC 230 then sets up a physical layer connection between the physical layer NE ports 215 and 216. For example, the T-SDNC 230 creates a connection to implement an addition of a LAG link member to a LAG 240 by assigning a pair of physical layer NE ports 215 and 216, creating a new lambda between the physical layer NE ports 215 and 216, assigning a partial lambda between the physical layer NE ports 215 and 216, adding an extra time slot between the ports, or performs any other function to establish a physical connection between the physical layer NE ports 215 and 216. Further, the T-SDNC 230 removes a connection to implement a deletion of a LAG link member from a LAG 240 by deallocating a pair of physical layer NE ports 215 and 216, removing a lambda between the physical layer NE ports 215 and 216, deallocating a partial lambda between the physical layer NE ports 215 and 216, removing a time slot between the ports, or performs any other function to remove a physical connection between the physical layer NE ports 215 and 216. After the physical layer connection between the physical layer NE ports 215 and 216 is added or removed, the T-SDNC 230 may or may not transmit an acknowledgement message to each of the network layer NEs 204 and 205 and/or a N-SDNC.

Figure 3:
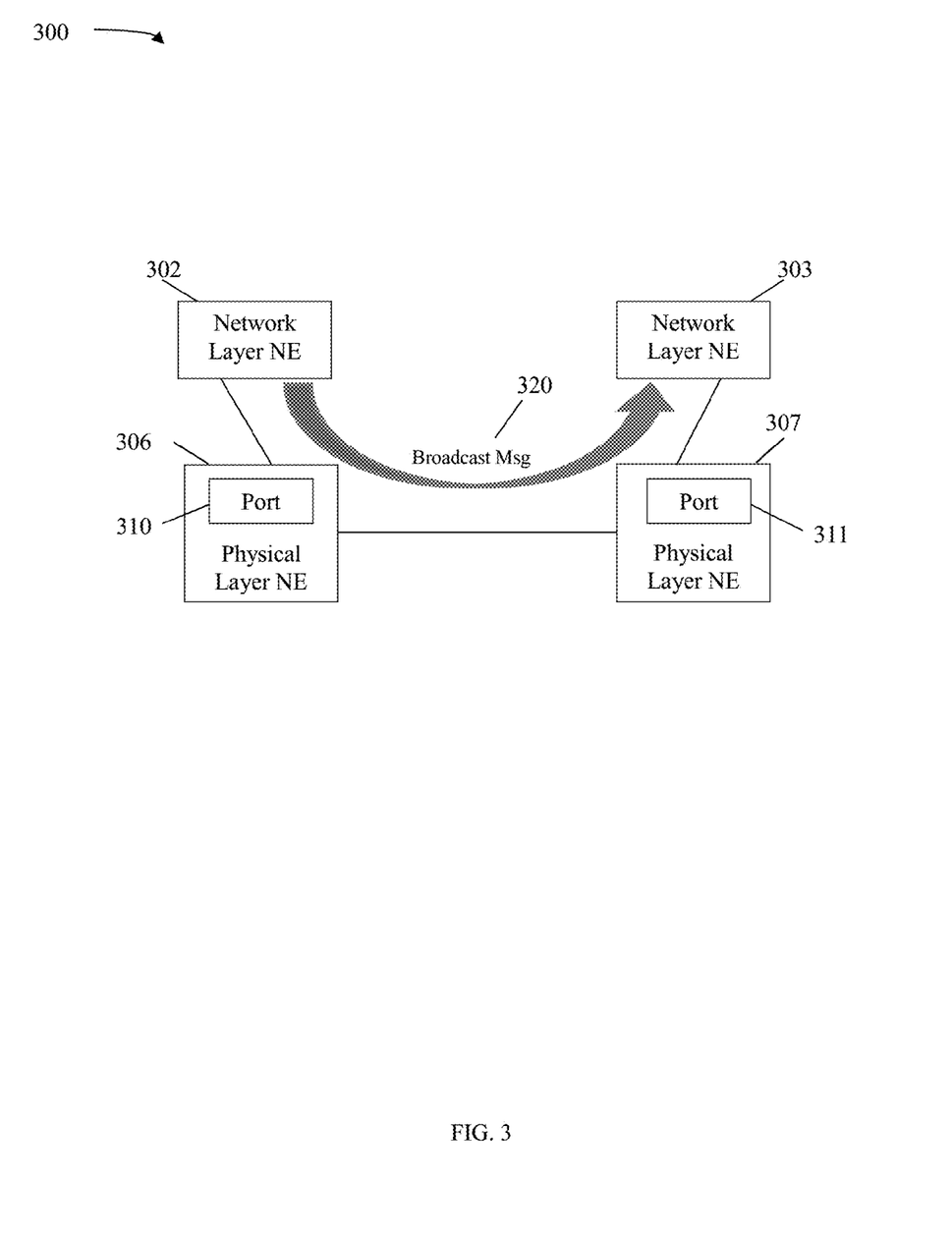
FIG. 3 is a schematic diagram of an embodiment of physical layer network elements configured to inspect network layer broadcast messages.

FIG. 3 is a schematic diagram 300 of an embodiment of physical layer NEs 306-307 configured to inspect network layer broadcast messages 320 transmitted by network layer NEs 302-303. Network 300 comprises network layer NEs 302 and 303 and physical layer NEs 306 and 307, which may be substantially similar to network layer NEs 102 and 103 and physical layer NEs 104, 105, and 106, respectively. The port 310 is part of the physical layer NE 306 and the port 311 is part of the physical layer NE 307, respectively. Network layer NE 302 transmits a broadcast message 320 toward network layer NE 303. Network layer NEs 302 and 303 are communicatively coupled via physical layer NEs 306 and 307. The physical layer NE 306 and the physical layer NE 307 may each inspect the broadcast message 320 as the message traverses the physical layer NEs. The broadcast message 320 may be a network layer adjacency discovery message or a network layer LAG request message, for example in an OSPF hello message, an IS-IS hello message, a BGP hello message, etc., or a network layer maintenance message. The physical layer NE 306 and the physical layer NE 307 may inspect header information of the broadcast message 320 forwarded across port 310 and port 311, respectively.

By inspecting header information of the network layer adjacency discovery message (e.g. broadcast message 320), the physical layer NE 306 determines that the port 310 is adjacent to the network layer NE 302 and the physical layer NE 307 determines that the port 311 is adjacent to the network layer NE 303. Then the physical layer NE 306 transmits an advertisement message, such as an LSA, at the physical layer comprising identification information of the physical layer NE 306, identification information of the port 310, and/or identification information of the network layer NE 302. Similarly, the physical layer NE 307 transmits an advertisement message at the physical layer comprising identification information of the physical layer NE 307, identification information of the port 311, and/or identification information of the network layer NE 303. The advertisements may be employed by a T-SDNC, such as T-SDNC 110 or 230 to support creation of a physical layer topology to network layer topology mapping.

By inspecting header information of a network layer LAG request message, the physical layer NE 306 determines that the network layer NE 302 is requesting an addition, removal, or refresh of a network layer LAG link member with the network layer NE 303. Then the physical layer NE 306 transmits an advertisement message, such as an LSA, at the physical layer comprising a new LAG link member request, identification information of the network layer NE 302, and/or identification information of the network layer NE 303. Similarly, the physical layer NE 307 transmits an advertisement message at the physical layer comprising a new LAG link member request, identification information of the network layer NE 303, and/or identification information of the network layer NE 302. The advertisements may be employed by a T-SDNC, such as T-SDNC 110 or 230 to support creation or removal of a physical layer connection to implement addition or removal of the network layer LAG link member.

Figure 4:
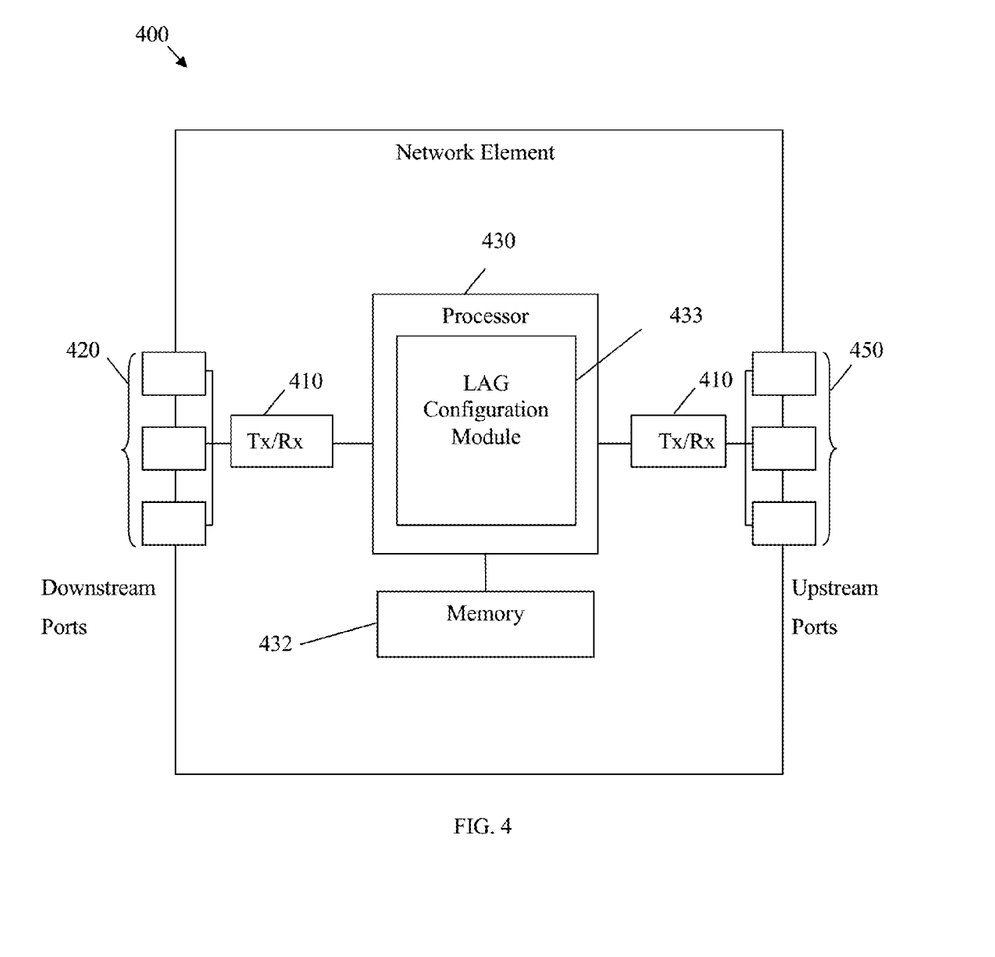
FIG. 4 is a schematic diagram of an embodiment of a NE.

FIG. 4 is a schematic diagram of an embodiment of a network element (NE) 400, which may act as an SDNC (e.g. T-SDNC 110 and/or 230) or a network device (e.g. physical layer NEs 104-106, 210-213, 306-307 or network layer NEs 102-103, 202-205, or 302-303, etc.) in an SDN domain. NE 400 may be configured to determine routes and/or links in an SDN domain that are visible to other interconnected SDN domains, generate SDN specific topology information, advertise the SDN specific topology information to the interconnected SDN domains, map logical topology to physical topology, and/or configure network layer LAG link members, depending on the embodiment. NE 400 may be implemented in a single node or the functionality of NE 400 may be implemented in a plurality of nodes. One skilled in the art will recognize that the term NE encompasses a broad range of devices of which NE 400 is merely an example. NE 400 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 400. For instance, the features/methods in the disclosure may be implemented using hardware, firmware, and/or software installed to run on hardware.

As shown in FIG. 4, the NE 400 comprises transceivers (Tx/Rx) 410, which may be transmitters, receivers, or combinations thereof. A Tx/Rx 410 is coupled to plurality of downstream ports 420 for transmitting and/or receiving frames from other nodes and a Tx/Rx 410 is coupled to plurality of upstream ports 450 for transmitting and/or receiving frames from other nodes, respectively. A processor 430 is coupled to the Tx/Rx 410 to process the frames and/or determine which nodes to send the frames to. The processor 430 may comprise one or more multi-core processors and/or memory devices 432, which function as data stores, buffers, etc. Processor 430 may be implemented as a general processor or may be part of one or more application specific integrated circuits (ASICs) and/or digital signal processors (DSPs).

Figure 5:
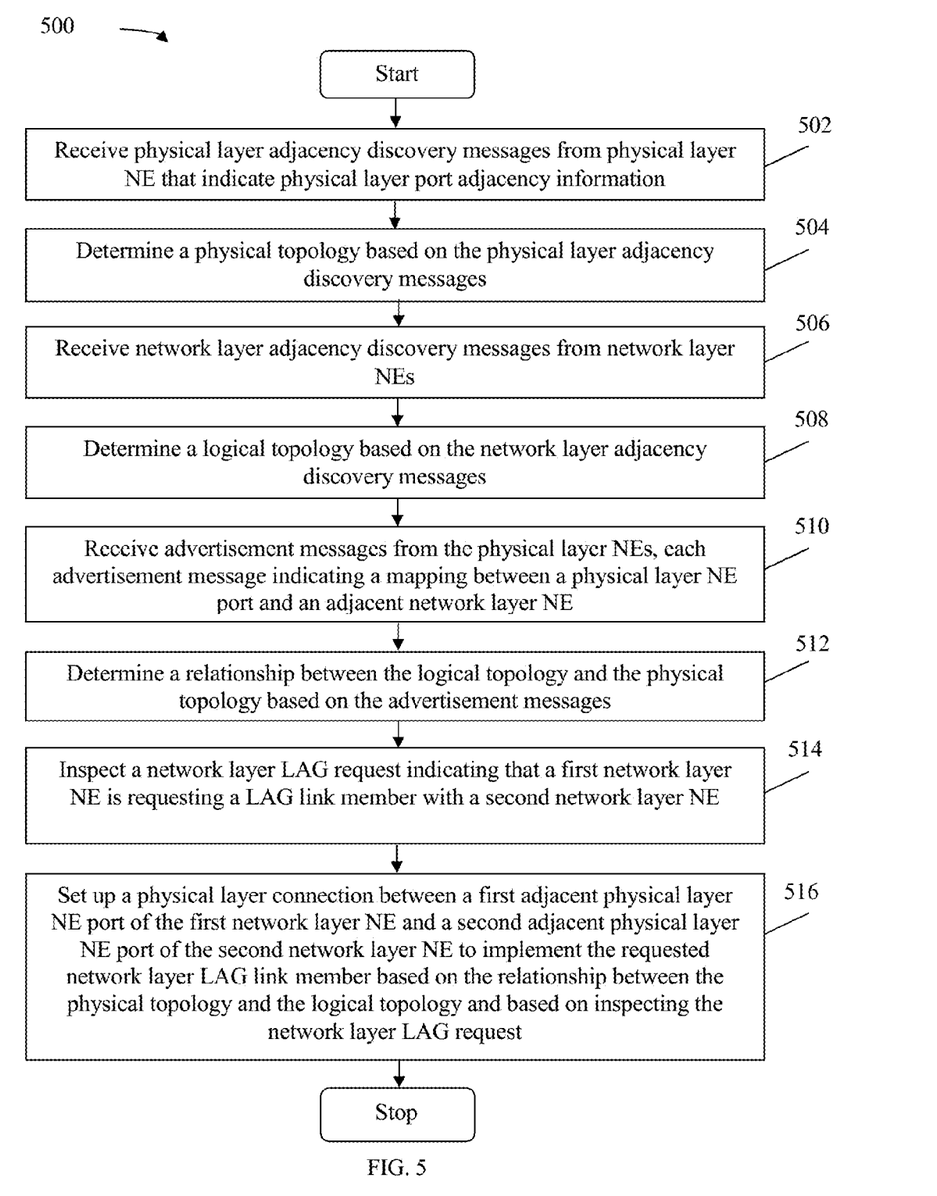
FIG. 5 is a flowchart of an embodiment of a method for adding an LAG member link.
Figure 6:
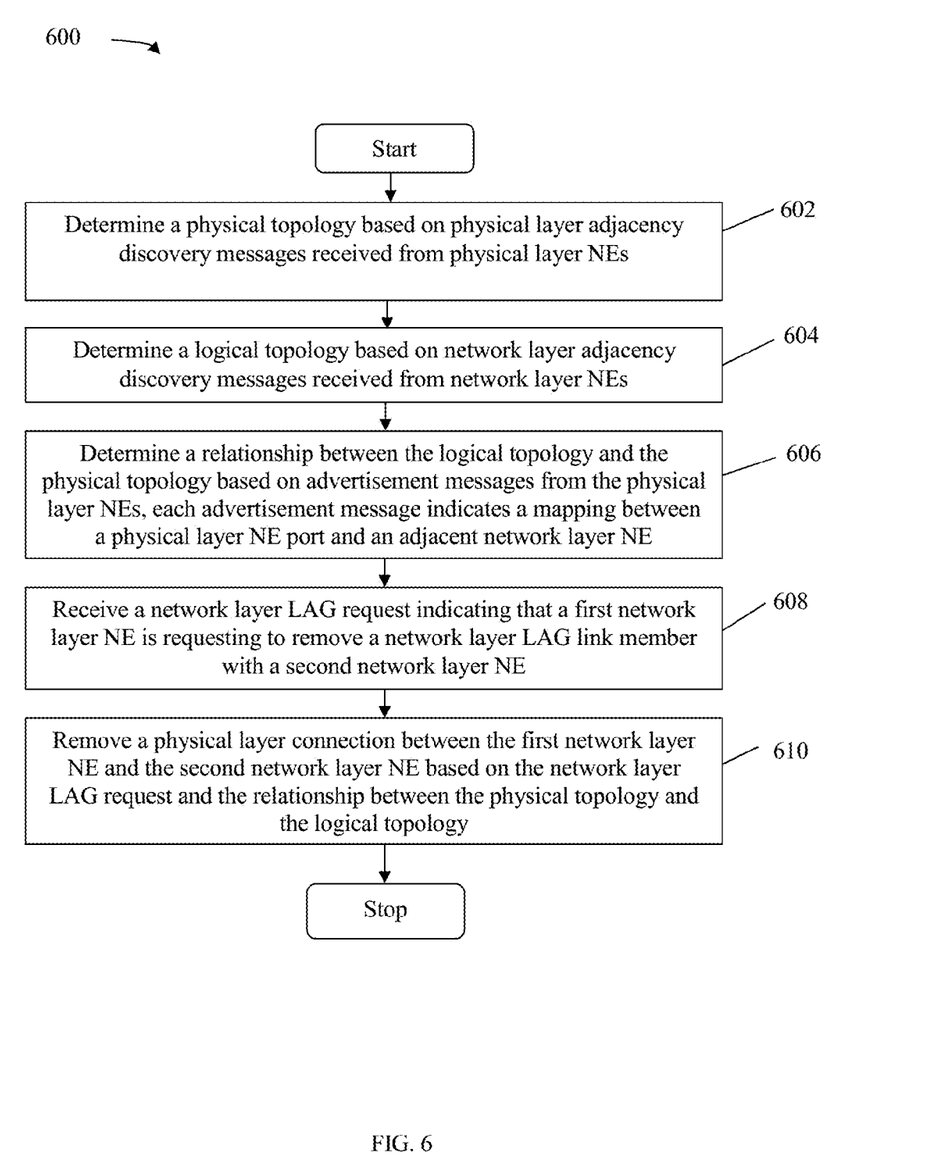
FIG. 6 is a flowchart of an embodiment of a method for removing a LAG member link.

Processor 430 comprises a LAG configuration module 433, which may implement a LAG addition method 500 and/or a LAG removal method 600 as discussed more fully below. In an alternative embodiment, the LAG configuration module 433 may be implemented as instructions stored in the memory devices 432, which are executed by processor 430. The memory device 432 may comprise a cache for temporarily storing content, e.g., a Random Access Memory (RAM). Additionally, the memory device 432 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 400, at least one of the processor 430 and/or memory device 432 are changed, transforming the NE 400 in part into a particular machine or apparatus, e.g., a physical topology and/or logical topology management system, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

FIG. 5 is a flowchart of an embodiment of a method 500 for adding a LAG member link, which may be implemented in a T-SDNC, such as T-SDNC 110 or 230. Method 500 may be initiated when a monitoring application and/or administrator determines to increase the capacity of an existing network layer link and/or add a new network link. At step 502, method 500 receives physical layer adjacency discovery messages (e.g., broadcast messages 120, 220, or 320) from physical layer NEs (e.g., physical layer NEs 104-106, 210-213, or 306-307) that indicate physical layer port adjacency information. At step 504, method 500 determines a physical topology based on the physical layer adjacency discovery messages. At step 506, method 500 receives network layer adjacency discovery messages from network layer NEs (e.g., network layer NEs 102-103, 202-205, or 302-303). At step 508, method 500 determines a logical topology based on the network layer adjacency discovery messages. At step 510, method 500 receives advertisement messages from the physical layer NEs, each advertisement message indicating a mapping between a physical layer NE port (e.g., physical layer NE ports 215-216 or 310-311) and an adjacent network layer NE. At step 512, method 500 determines a relationship of the logical topology and the physical topology based on the advertisement messages. At step 514, method 500 inspects a network layer LAG request indicating that a first network layer NE is requesting a LAG link member with a second network layer NE. At step 516, method 500 sets up one or more physical layer connections between adjacent physical layer NEs and/or physical layer NE ports to implement the requested network layer LAG link member based on the relationship between the physical topology and the logical topology and based on inspecting the network layer LAG request.

FIG. 6 is a flowchart of an embodiment of a method 600 for removing a LAG link member, which may be implemented in a T-SDNC, such as T-SDNC 110 or 230. Method 600 may be initiated when a monitoring application and/or administrator determines to decrease the capacity of an existing network layer link and/or remove a network link. At step 602, method 600 determines a physical topology based on physical layer adjacency discovery messages received from physical layer NEs (e.g., physical layer NEs 104-106, 210-213, or 306-307). At step 604, method 600 determines a logical topology based on network layer adjacency discovery messages received from network layer NEs (e.g., network layer NEs 102-103, 202-205, or 302-303). At step 606, method 600 determines a relationship between the logical topology and the physical topology based on advertisement messages from the physical layer NEs, each advertisement message indicating a mapping between a physical layer NE port (e.g., physical layer NE ports 215-216 or 310-311) and an adjacent network layer NE. At step 608, method 600 receives a network layer LAG request indicating that a first network layer NE is requesting to remove a network layer LAG link member with a second network layer NE. In an alternate embodiment, method 600 may receive periodic network layer LAG requests messages indicating a network layer LAG link member should be refreshed. In such case, method 600 may fail to receive a network layer LAG request at step 608 and may treat such failure to receive a timely network layer LAG request as an implied request to remove the associated LAG link member. In either case, at step 610, method 600 removes a physical layer connection between the first network layer NE and the second network layer NE based on the network layer LAG request and the relationship between the physical topology and the logical topology.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A transport software defined networking (SDN) controller, comprising:
a receiver configured to:
receive a first advertisement message from a first physical layer network element (NE) and a second advertisement message from a second physical layer NE, the first advertisement message indicating a mapping between a first port of the first physical layer NE and a first network layer NE, and the second advertisement message indicating a mapping between a second port of the second physical layer NE and a second network layer NE; and
receive a network layer link aggregation group (LAG) request, the network layer LAG request indicating a request to modify a link member in a LAG, the link member connecting the first network layer NE and the second network layer NE;
a processor coupled to the receiver and configured to:
determine a relationship between a logical topology and a physical topology based on the first and second advertisement messages from the first and second physical layer NEs;
inspect a header of the network layer LAG request to obtain information associated with the request to modify the link member in the LAG; and
modify a physical layer connection between the first port adjacent to the first network layer NE and the second port adjacent to the second network layer NE to implement the request to modify the link member in the LAG based on the relationship between the physical topology and the logical topology and based on the inspected network layer LAG request.

2. The transport SDN controller of claim 1, wherein the network layer LAG request is a request to increase a capacity of the LAG, and wherein modifying the physical layer connection comprises creating a connection between the first port of the first physical layer NE port and the second port of the second physical layer NE.

3. The transport SDN controller of claim 2, wherein creating the connection comprises assigning the first port of the first physical layer NE port and the second port of the second physical layer NE to support a communication between the first network layer NE and the second network layer NE.

4. The transport SDN controller of claim 2, wherein creating the connection comprises assigning a wavelength between the first port of the first physical layer NE port and the second port of the second physical layer NE to support a communication between the first network layer NE and the second network layer NE.

5. The transport SDN controller of claim 2, wherein creating the connection comprises assigning a time division multiplexed portion of a wavelength between the first port of the first physical layer NE and the second port of the second physical layer NE to support a communication between the first network layer NE and the second network layer NE.

6. The transport SDN controller of claim 1, wherein the network layer LAG request is a request to decrease a capacity of the LAG, and wherein modifying the physical layer connection comprises removing a connection between the first port of the first physical layer NE port and the second port of the second physical layer NE.

7. The transport SDN controller of claim 6, wherein removing the connection comprises deallocating the first port of the first physical layer NE port and the second port of the second physical layer NE from supporting a communication between the first network layer NE and the second network layer NE.

8. The transport SDN controller of claim 6, wherein removing the connection comprises deallocating a wavelength between the first port of the first physical layer NE port and the second port of the second physical layer NE from supporting a communication between the first network layer NE and the second network layer NE.

9. The transport SDN controller of claim 6, wherein removing the connection comprises deallocating a time division multiplexed portion of a wavelength between the first port of the first physical layer NE port and the second port of the second physical layer NE from supporting a communication between the first network layer NE and the second network layer NE.

10. The transport SDN controller of claim 1, wherein the inspected network LAG request comprises a network layer address of the first network layer NE and a network layer address of the second network layer NE, and wherein implementing the request to modify the link member in the LAG based on the relationship between the physical topology and the logical topology comprises:
determining that the network layer address of the first network layer NE is adjacent to the first port based on the relationship between the physical topology and the logical topology;
determining that the network layer address of the second network layer NE is adjacent to the second port based on the relationship between the physical topology and the logical topology; and
selecting the connection for modification based on the determinations of adjacencies of the physical layer ports to the network layer NEs.

11. The transport SDN controller of claim 1, wherein the processor is further configured to:
determine the physical topology based on physical layer adjacency discovery messages received from the physical layer NEs; and
determine the logical topology based on network layer adjacency discovery messages received from the network layer NEs.

12. A method implemented by a transport software defined networking (SDN) controller, the method comprising:
receiving a first advertisement message from a first physical layer network element (NE) and a second advertisement message from a second physical layer NE, the first advertisement message indicating a mapping between a first port of the first physical layer NE and a first network layer NE, and the second advertisement message indicating a mapping between a second port of the second physical layer NE and a second network layer NE;
determining a relationship between a logical topology and a physical topology based on the first and second advertisement messages from the first and second physical layer NEs;

receiving a network layer link aggregation group (LAG) request from the first physical layer NE, the network layer LAG request indicating a request to modify a link member in a network layer LAG, and the link member connecting the first network layer NE and a second network layer NE;

inspect a header of the network layer LAG request to obtain information associated with the request to modify the link member in the LAG; and modifying a physical layer connection between the first port of the first physical layer NE and the second port of the second physical layer NE to implement the request to modify the link member in the LAG based on the relationship between the physical topology and the logical topology and based on the received network layer LAG request.

13. The method of claim 12, further comprising:

receiving network layer adjacency discovery messages from the first and second network layer NEs; and determining the logical topology based on the network layer adjacency discovery messages, wherein the relationship between the logical topology and the physical topology is determined based on the mappings between the physical layer NE ports and adjacent network layer NEs.

14. The method of claim 12, further comprising transmitting an acknowledgement message to the first network layer NE and the second network layer NE to indicate modification of the physical layer connection to implement the request to modify the link member in the LAG is complete.

15. The method of claim 12, wherein the network layer LAG request indicates a timeout duration, and wherein the method further comprises removing the physical layer connection upon failure to receive a second network layer LAG request refreshing the network layer LAG request within the timeout period in order to implement an implied network layer LAG deletion request.

16. A method implemented by a transport software defined networking (SDN) controller, the method comprising:

receiving a first advertisement message from a first physical layer network element (NE) and a second advertisement message from a second physical layer NE, the first advertisement message indicating a mapping between a first port of the first physical layer NE and a first network layer NE, and the second advertisement message indicating a mapping between a second port of the second physical layer NE and a second network layer NE;

determining a relationship between a logical topology and a physical topology based on the first and second advertisement messages from the first and second physical layer NEs;

inspecting a network layer broadcast to obtain a network layer link aggregation group (LAG) request, the network layer LAG request indicating a request to modify a link member in a network layer LAG, and wherein the link member connects a first network layer NE and a second network layer NE;

obtain information associated with the request to modify the link member in the LAG from a header of the network layer LAG request; and modifying a physical layer connection between the first port NE adjacent to the first network layer NE and the second port adjacent to the second network layer NE to implement the request to modify the link member in the LAG based on the relationship between the physical topology and the logical topology and based on the received network layer LAG request.

17. The method of claim 16, wherein the network layer LAG request is inspected from a network layer open shortest path first (OSPF) message, an intermediate system to intermediate system (IS-IS) message, or a border gateway protocol (BGP) message.

18. The method of claim 16, wherein the transport SDN controller is configured to manage open systems interconnection (OSI) layer 1 and OSI layer 0 network communication functions, and wherein the transport SDN controller is not configured to manage OSI layer 2-4 network communication functions.

19. The method of claim 16, wherein the network layer LAG request indicates a timeout duration, and wherein the method further comprises removing the physical layer connection upon failure to receive a second network layer LAG request refreshing the network layer LAG request within the timeout period in order to implement an implied network layer LAG deletion request.

20. The method of claim 16, further comprising:

receiving network layer adjacency discovery messages from network layer NEs; and determining the logical topology based on the network layer adjacency discovery messages, wherein the relationship between the logical topology and the physical topology is determined based on the mappings between the physical layer NE ports and the adjacent network layer NEs.

* * * * *

UNITED STATES PATENT AND TRADEMARK OFFICE
CERTIFICATE OF CORRECTION

| | |
|---|---|
| PATENT NO. | : 10,015,053 B2 |
| APPLICATION NO. | : 14/718949 |
| DATED | : July 3, 2018 |
| INVENTOR(S) | : Peter Ashwood-Smith |

Page 1 of 1

It is certified that error appears in the above-identified patent and that said Letters Patent is hereby corrected as shown below:

In the Claims

Column 15, Lines 38-48, through Column 16, Lines 1-20, Claim 16 should read:
16. A method implemented by a transport software defined networking (SDN) controller, the method comprising:
    receiving a first advertisement message from a first physical layer network element (NE) and a second advertisement message from a second physical layer NE, the first advertisement message indicating a mapping between a first port of the first physical layer NE and a first network layer NE, and the second advertisement message indicating a mapping between a second port of the second physical layer NE and a second physical network layer NE;
    determining a relationship between a logical topology and a physical topology based on the first and second advertisement messages from the first and second physical layer NEs;
    inspecting a network layer broadcast message to obtain a network layer link aggregation group (LAG) request, the network layer LAG request indicating a request to modify a link member in a network layer LAG, and wherein the link member connects a first network layer NE and a second network layer NE;
    obtain information associated with the request to modify the link member in the LAG from a header of the network layer LAG request; and
    modifying a physical layer connection between the first port adjacent to the first network layer NE and the second port adjacent to the second network layer NE to implement the request to modify the link member in the LAG based on the relationship between the physical topology and the logical topology and based on the received network layer LAG request.

Signed and Sealed this
Fourth Day of September, 2018

Andrei Iancu
*Director of the United States Patent and Trademark Office*